No. 746,511. PATENTED DEC. 8, 1903.
J. F. HOTTMAN, Jr.
BOILER BRACE.
APPLICATION FILED JUNE 22, 1903.
NO MODEL.
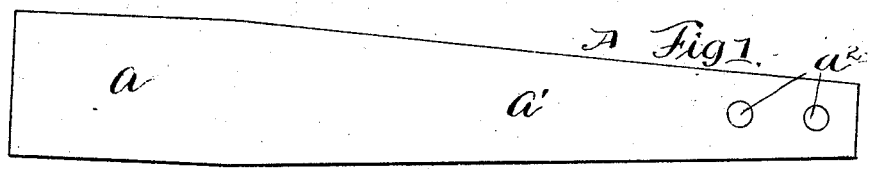
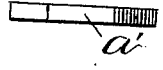
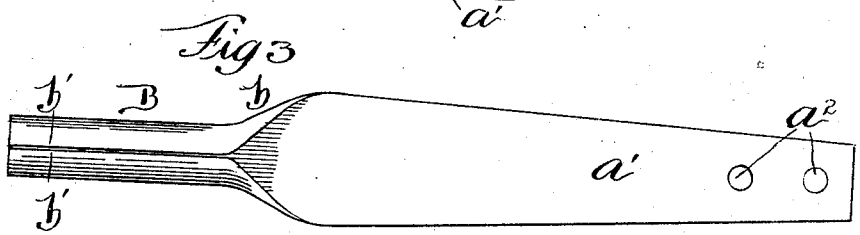
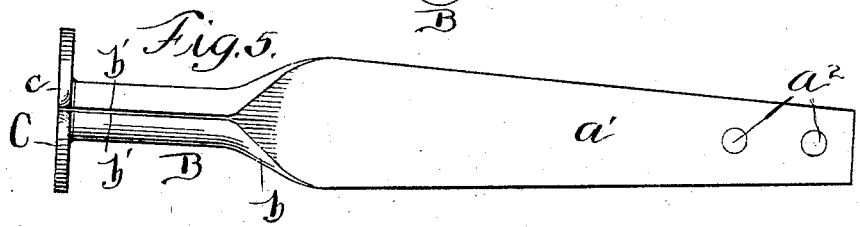
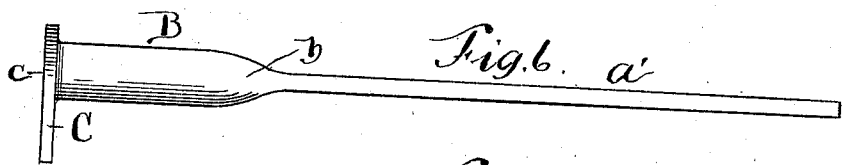
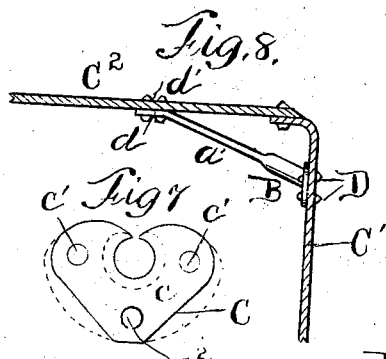
Witnesses
Samuel W. Banning
Walker Banning
Inventor
John Ferdinand Hottman Jr.
By Banning & Banning
Attys.

No. 746,511. Patented December 8, 1903.

UNITED STATES PATENT OFFICE.

JOHN FERDINAND HOTTMAN, JR., OF DUBUQUE, IOWA.

BOILER-BRACE.

SPECIFICATION forming part of Letters Patent No. 746,511, dated December 8, 1903.

Application filed June 22, 1903. Serial No. 162,655. (No model.)

*To all whom it may concern:*

Be it known that I, JOHN FERDINAND HOTTMAN, Jr., a citizen of the United States, residing at Dubuque, in the county of Dubuque and State of Iowa, have invented certain new and useful Improvements in Boiler-Braces, of which the following is a specification.

The object of this invention is to produce a brace for use in boilers or other similar structures which shall be strong and durable and at the same time easily manufactured and fitted into place and which shall be so formed and arranged that the strain brought thereon will be distributed over those portions of the brace best fitted to withstand it.

The invention consists in the features of construction and combination of parts hereinafter described and claimed.

In the drawings, Figure 1 is a plan view of a blank used in forming the brace of this invention; Fig. 2, an end of the blank; Fig. 3, a plan view of the brace partially formed; Fig. 4, a similar end view; Fig. 5, a plan view of the complete brace; Fig. 6, a similar side view; Fig. 7, a similar end view, and Fig. 8 a view showing the brace as applied to a boiler.

The brace is formed from a blank A of suitable material, preferably boiler-steel of suitable length, and is formed to have a shank end $a$ and a tapered body $a'$, the latter being provided near its end with holes $a^2$ for the passage therethrough of bolts or rivets. After forming the blank the shank end, which is of uniform width, is heated for a suitable distance, preferably to a point about a quarter way down the body, and the shank end is then bent or turned in any suitable manner to have a tubular formation B, as shown in Fig. 3. When the blank has been thus formed, the union between the tubular shank and the body will be shaped to form a tapered shoulder $b$, which gradually slopes down or merges into the flat body. The tubular shank is formed to have its abutting edges $b'$ lie in close contact to one another, thus forming, in effect, a solid tube, which gives to the shank the greatest possible strength and rigidity.

After the shank is formed in the shape shown in Figs. 3 and 4 the end is pressed or turned out at a suitable angle to the shank to form a foot C, (best shown in Fig. 7,) which foot is provided with a flat contacting face $c$, adapted to contact the inner side $G'$ of the head of a boiler, as shown in Fig. 8. The foot when first formed will have the general contour shown by the dotted lines in Fig. 7, but is finished by shearing or cutting it to have a substantially triangular outline, as shown by the full lines. The foot, as shown, is provided with two rivet-holes $c'$ on opposite sides of and in line with the center of the tubular shank, and the foot in its lower angle has a rivet-hole $c^2$ at equal distances from the oppositely-disposed rivet-holes $c'$. In use the foot of the brace is riveted to the head $C'$ of a boiler by means of rivets D passing therethrough, and the foot is arranged to have a suitable angular relation to the shank and body, and the body is angularly bent to form an attaching end $d$, which is secured, by means of rivets $d'$, to the inner face $C^2$ of the boiler-shell, thereby firmly securing the head of the boiler.

The advantages of this brace are that it is a solid weldless steel brace made with one heating of the metal. The foot of the brace is solid and continuous, as shown in Fig. 7, and the holes in the foot are so arranged in respect to the shank and body that there will be a direct pull along the center line of the brace, thereby preventing the rivets from being pried or sheared off by any strain exerted thereon. This construction of the foot gives an unyielding support to the brace and overcomes the objection to the feet in forms of braces hitherto used and known as "crow-foot" braces. In all other forms of braces having feet to rivet them to the head of the boiler the feet are independent of each other, and it is a common occurrence for these feet to crack or break at the point of jointure with the brace, thus rendering the entire device worthless.

What I regard as new, and desire to secure by Letters Patent, is—

1. A brace formed from a single piece of metal having a flat body adapted to be secured to a boiler-shell and terminating in a tubular shank adapted to be secured to the head of the boiler, substantially as described.

2. A brace formed from a single piece of metal having a flat body adapted to be secured to a boiler-shell and terminating in a tubular shank provided with a flat contacting foot in angular relation to the shank and adapted to be secured to the boiler-head, substantially as described.

3. A brace formed from a single piece of metal provided with a body adapted to be secured to a boiler-shell and terminating in a tubular shank formed to have its edges in abutting relation and provided on its end with an outwardly-turned flat contacting foot of substantially triangular formation, substantially as described.

4. A brace formed from a single piece of metal provided with a body adapted to be secured to a boiler-shell and terminating in a tubular shank formed to have its edges in abutting relation and provided on its end with an outwardly-turned flat contacting foot provided with rivet-holes on opposite sides of the shank and in line with the center of the brace, substantially as described.

5. A brace formed from a single piece of metal provided with a body adapted to be secured to a boiler-shell and terminating in a tubular shank formed to have its edges in abutting relation and provided on its end with an outwardly-turned flat contacting foot integrally formed to have a substantially triangular shape and provided with two rivet-holes oppositely disposed and in line with the center of the brace and further provided with an additional rivet-hole in the angle formed by the converging sides of the foot, substantially as described.

6. A brace formed from a single piece of metal provided with a body adapted to be secured to a boiler-shell and terminating in a tubular shank formed to have its edges in abutting relation and provided on its end with an outwardly-turned flat contacting foot provided with rivet-holes in line with the center of the brace, substantially as described.

7. A brace formed from a single piece of metal provided with a body adapted to be secured to a boiler-shell, and terminating in a shank provided on its end with an outwardly-turned continuous flat contacting foot forming a continuous flange around the shank provided with rivet-holes in line with the center of the brace, substantially as described.

8. A brace formed from a blank having a head end of uniform width and a tapered body adapted to be secured to a boiler-shell, the head end being bent or formed to tubular shape and having its edges in abutting relation and the end edge of the tubular shank being outwardly turned to form a continuous flat contacting foot, substantially as described.

JOHN FERDINAND HOTTMAN, JR.

Witnesses:
LOUIS C. KOLFENBACH,
R. E. HAGERTY.